J. KLECKNER.
Chimney.

No. 100,705.  Patented March 8, 1870.

Witnesses.
Chas. E. Upperman
P. A. Devine

Inventor.
Joseph Kleckner,
By his Attorneys,
Upperman & Johnson.

United States Patent Office.

JOSEPH KLECKNER, OF MOTTVILLE, MICHIGAN.

Letters Patent No. 100,705, dated March 8, 1870.

IMPROVEMENT IN THE CONSTRUCTION OF CHIMNEYS AND FLUES.

The Schedule referred to in these Letters Patent and making part of the same.

*To all whom it may concern:*

Be it known that I, JOSEPH KLECKNER, of Mottville, in the county of St. Joseph, and State of Michigan, have invented certain new and useful Improvements in Molding and Constructing Flues for Buildings and other purposes; and I do hereby declare that the following is a full, clear, and exact description of the same, reference being had to the accompanying drawings thereof which make part of this specification, and in which—

Figure 1:
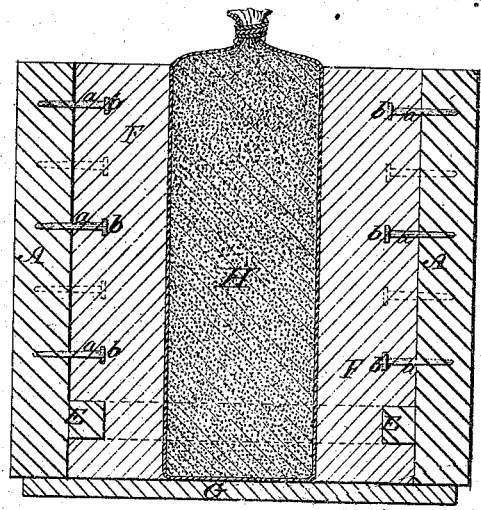
Figure 1 represents a vertical section, showing a flue formed between the joists of the flooring of a building, and a collapsible sand-bag core to form the flue.
Figure 2:
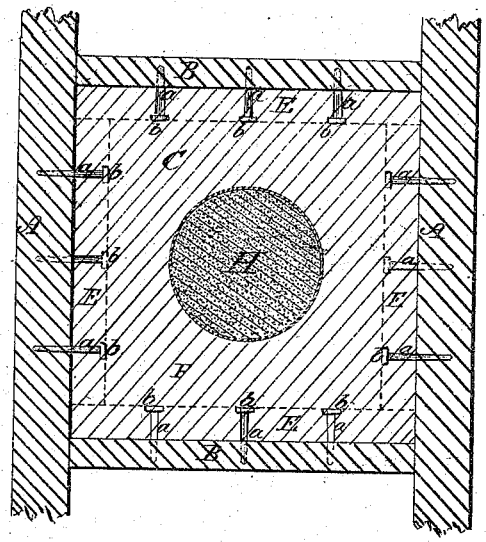
Figure 2 represents a horizontal section through the same.
Figure 3:
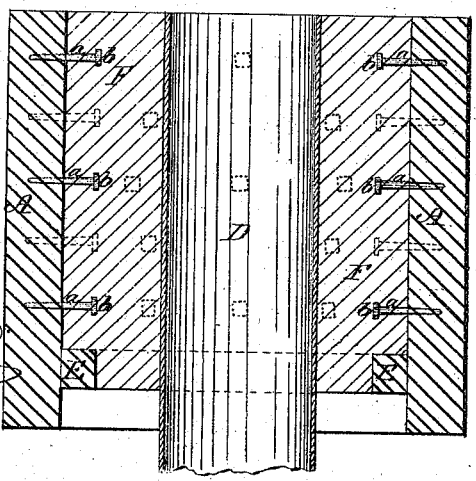
Figure 3 represents a vertical section of the same, showing the collapsible core removed, and a section of pipe inserted within the flue.

My invention relates to molding and constructing flues for buildings and other purposes, and consists in forming a flue in a square compartment between the joists of a building, and providing the interior thereof with foundation supports and a number of nails projecting into the compartment, in such manner as to imbed themselves into the cement, and thus constitute a skeleton frame for the latter, of which the flue is formed.

Also, in molding the flue of cement, by means of a collapsible sand-bag core, so that it may be readily withdrawn therefrom when the cement has set.

In the accompanying drawings—

A represents two of the joists of the floor in section, and

B, cross-boards secured between them, so as to form a square compartment, C, within which the flue D is formed.

Near the bottom of this compartment, I secure supports or cleats E, projecting sufficiently far therein to serve as a foundation for the cement F, and within the interior of this compartment throughout its surface, a suitable number of four-penny nails, *a*, is driven, extending into said compartment about half their length, so as to form a skeleton frame for the body of the cement, and thus support and lock it securely to the sides of the compartment C, the shank *a* of each nail forming a vertical support, while the heads *b* thereof brace it horizontally, so that the cement F will bear a very great pressure without being displaced.

The bottom of the flue is then temporarily closed by a board, G.

Within the center of the compartment C thus constructed, I suspend, by any convenient means, a sack, H, of perfectly dry sand, so as to just rest upon the bottom board G. The diameter of the sack must be equal throughout its length, and a little greater than the diameter of the pipe which is to pass through the flue D. The collapsible core H thus formed and centered, is held in position by its weight, so that it cannot move out of center as the cement is introduced. The cement is then poured into the chamber around the sack until the former is filled. As soon as the cement has set, the bottom board G is removed, the sack H is cut at its lower end, and the sand emptied therefrom into another sack or other convenient receptacle. The sack is then removed by drawing or peeling it from the cement, and the flue is completed, leaving the sack in a condition to be again used.

The sack is made of any suitable material, and, with the sand, is used to form the core of the cement, because any other material would adhere thereto, so that it could not be withdrawn, and, from the equal pressure of the cement around it, always maintains a perfect circle.

A flue thus molded and constructed, can be used where any flue or thimble is required, vertically or horizontally through partitions, floors, or walls, and when formed of my improved cement is a safeguard against accident by fire.

When the flue is formed between the joists of flooring, it may be plastered around the bottom of the foundation supports, and protected at its top by a piece of zinc, tin, or carpet.

As the cement used in the construction of these flues forms the subject of another application for a patent, of even date herewith, it need not be particularly described.

Having described my invention,

I claim—

1. A flue compartment, constructed with foundation supports E, and holding and bracing-nails *a b*, substantially as herein described.

2. A cement flue, D, supported and locked securely in position by means of an open skeleton frame, substantially as herein described.

3. In molding cement flues, the use of a collapsible core, made of canvas or other suitable material, and filled with dry sand, or its equivalent.

JOSEPH KLECKNER.

Witnesses:
S. C. COFFINBERRY,
DAN. M. HARVEY.